United States Patent
Hawver

[15] 3,679,011
[45] July 25, 1972

[54] WEIGHING SCALE ASSEMBLY

[72] Inventor: Ira M. Hawver, 4200 Emland Drive, Topeka, Kans. 66606

[22] Filed: Feb. 2, 1971

[21] Appl. No.: 111,920

[52] U.S. Cl. ........................177/134, 177/163, 177/187, 177/211, 177/255, 177/229, 177/DIG. 9
[51] Int. Cl. ....................G01g 3/08, G01g 3/14, G01g 19/04
[58] Field of Search ........................177/132–135, 141, 177/195, 210, 211, 229, 187–189, 255–259, 163, DIG. 8, DIG. 9

[56] References Cited

UNITED STATES PATENTS

| 2,962,275 | 11/1960 | Thurston | 177/211 |
|---|---|---|---|
| 2,793,851 | 5/1957 | Ruge | 177/211 |
| 3,421,593 | 1/1969 | Buchman | 177/163 X |
| 1,222,272 | 4/1917 | Emery | 177/255 |
| 2,742,278 | 4/1956 | Carleton | 177/211 X |
| 2,802,660 | 8/1957 | Williams | 177/211 X |
| 3,123,166 | 3/1964 | Schellentrager | 177/211 |
| 3,266,585 | 8/1966 | Boadle | 177/211 X |
| 3,299,976 | 1/1967 | Boadle et al. | 177/255 X |
| 3,407,891 | 10/1968 | Wiegand | 177/210 X |
| 3,512,595 | 5/1970 | Laimius | 177/211 X |

FOREIGN PATENTS OR APPLICATIONS

| 618,264 | 4/1961 | Canada | 177/134 |
|---|---|---|---|
| 843,677 | 8/1960 | Great Britain | 177/257 |

*Primary Examiner*—Robert S. Ward, Jr.
*Attorney*—Clelle W. Upchurch

[57] ABSTRACT

A scale assembly for determining the weight of a load carried by a railway car or the like while the vehicle is in motion. The assembly includes cells onto which the load is applied by a weighbridge which is restrained from moving longitudinally or laterally of the path of movement of the vehicle so that the true vertical load applied to the weighbridge is imposed on the load cells.

10 Claims, 5 Drawing Figures

Patented July 25, 1972

INVENTOR
IRA M. HAWVER

BY
ATTORNEY

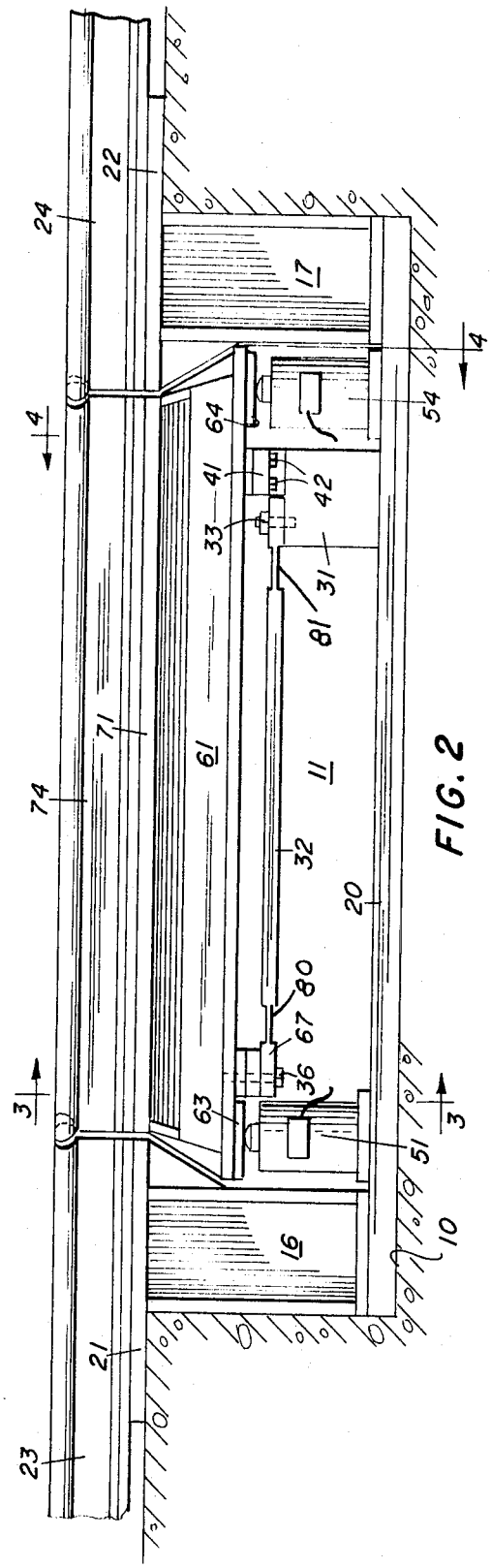
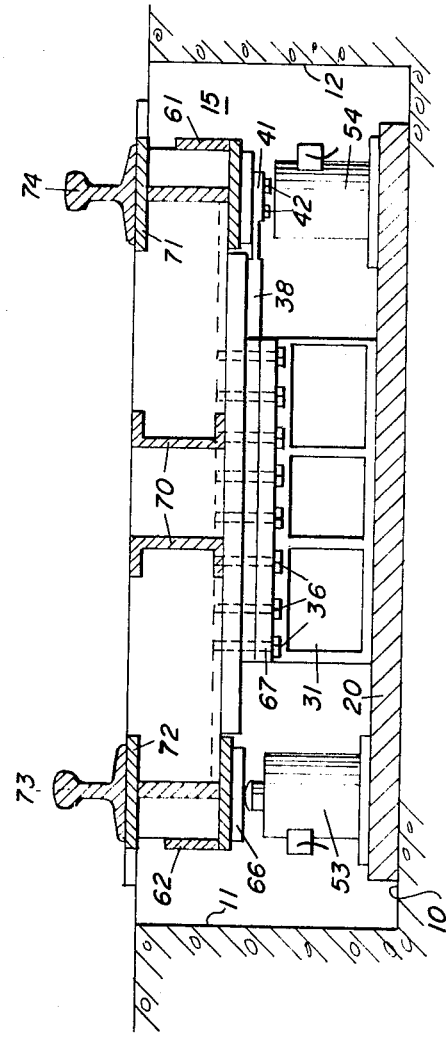

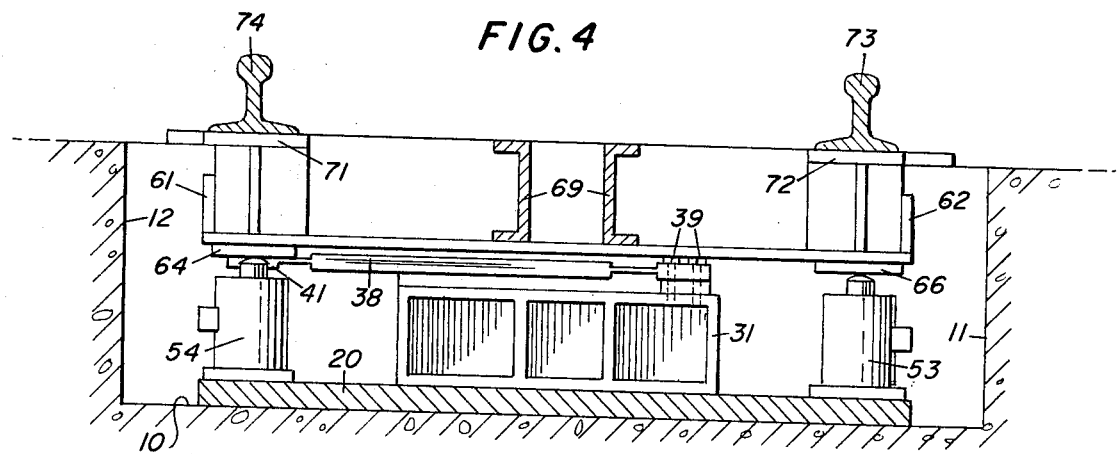
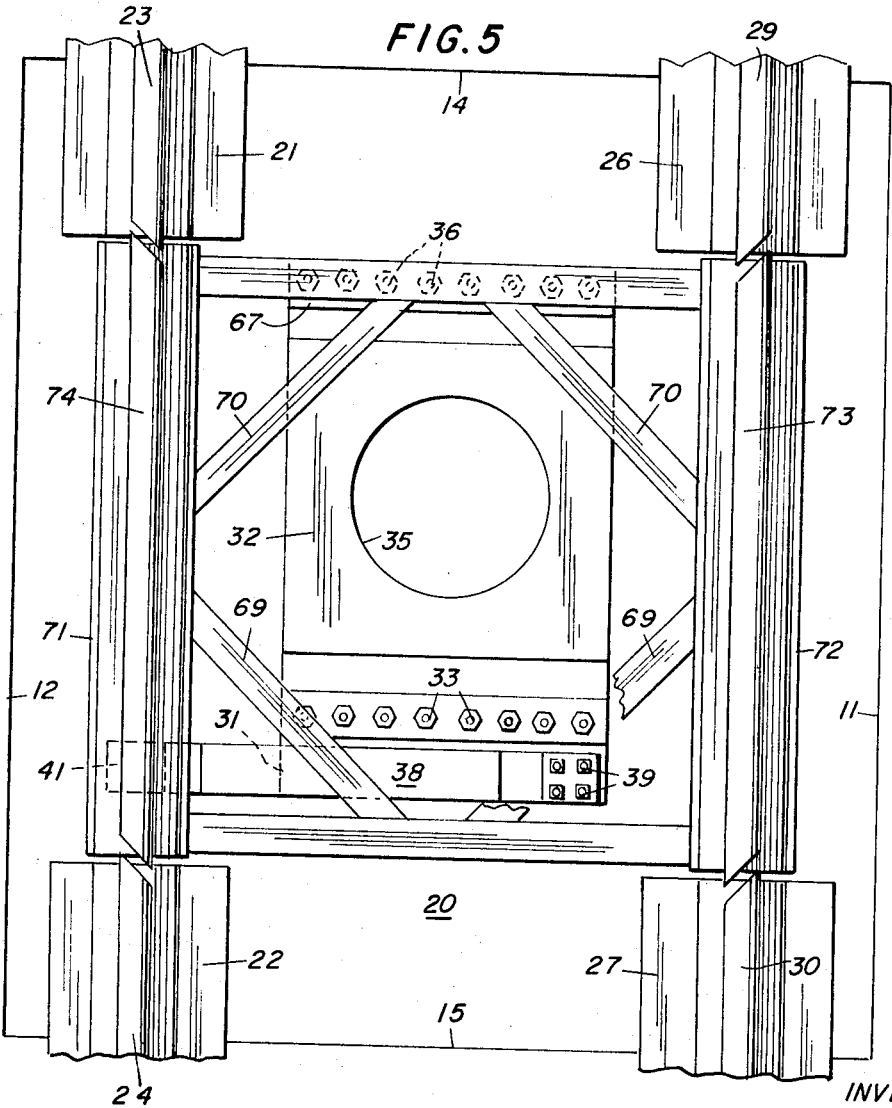

WEIGHING SCALE ASSEMBLY

The present invention relates to weighing apparatus and more particularly pertains to structure which insures that the true weight of a vehicle such as a railway car is vertically applied to load cells as the vehicle under observation moves over the weighing apparatus.

An object of the invention is to provide apparatus which may be fabricated and assembled as a unit and then transported for erection at a weighing station and to provide a weighing mechanism which will provide an accurate indication of the load of a vehicle moving over the apparatus and without having any of the lateral or longitudinal impact forces applied to the load cells.

Other objects and features of the invention will be appreciated and become apparent as the present disclosure proceeds and upon consideration of the following detailed description taken in conjunction with the annexed drawings wherein an embodiment of the invention is disclosed.

In the drawings:

FIG. 2 is a longitudinal side elevational view of the assembly showing the weighbridge in position on the load cells and the association of the mechanism with a railway track;

FIG. 3 is a transverse sectional view taken on the line 3—3 of FIG. 2;

FIG. 4 is a transverse sectional view taken on the line 4—4 of FIG. 2; and

FIG. 5 is a plan view of the weighing scale assembly and its relationship to the rails of a railway track.

Figure 1:
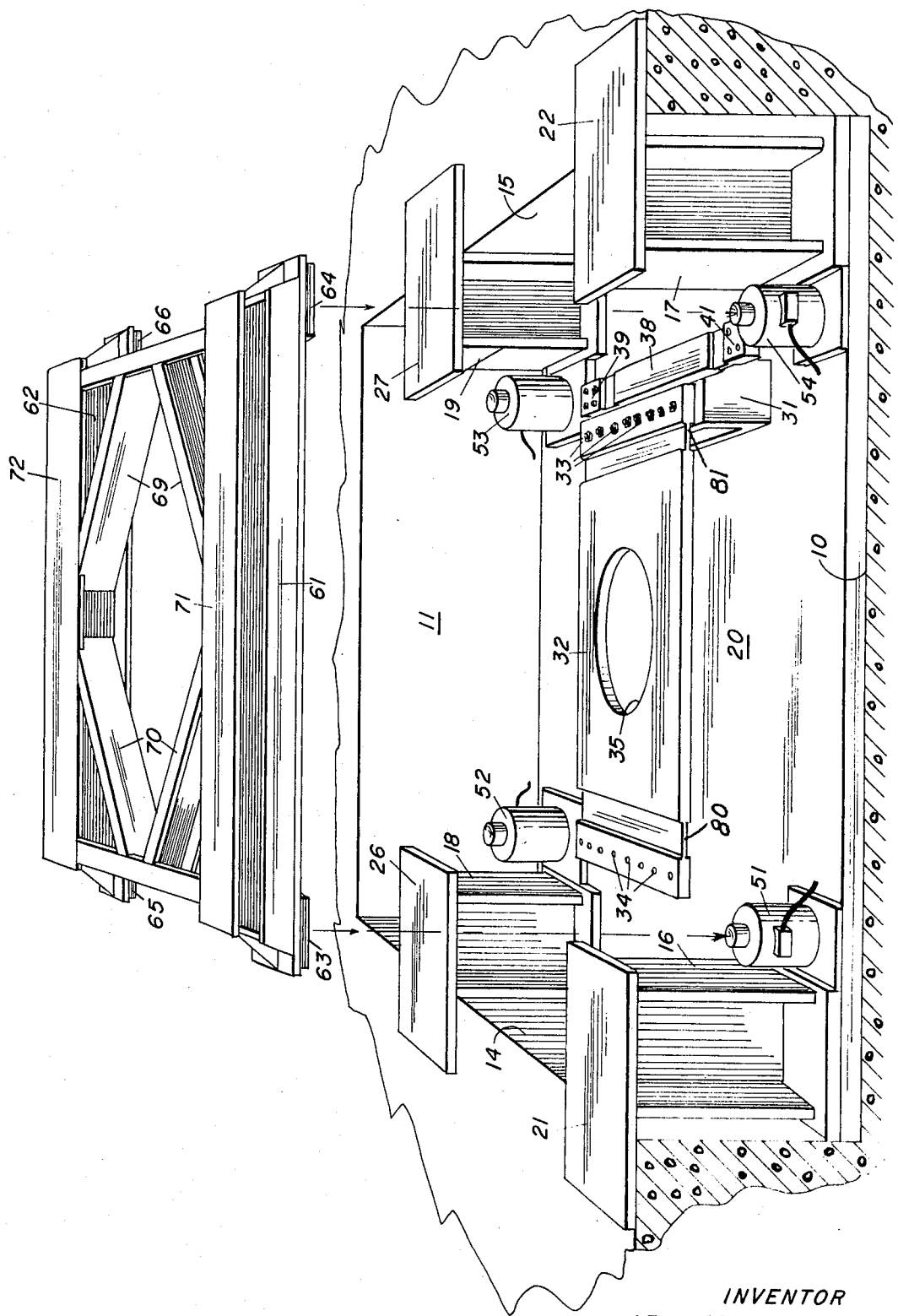
FIG. 1 is an exploded perspective view of a weighing scale assembly exhibiting the invention.

Referring to the drawings there is shown in FIG. 1 a pit which is formed by an excavation in the road bed over which the vehicle to be weighed is intended to travel. The floor is formed of reinforced concrete and has a horizontal upper surface 10. The walls lining the pit are also formed by reinforced concrete and are shown at 11 and 12. The end walls are depicted at 14 and 15. The masonry structure lining the pit provides space for accommodating the weighing apparatus and provides space for a pair of columns 16 and 17 which are in alignment with one of the tracks. Another pair of columns 18 and 19 are provided for the other track. These columns are supported by a base plate 20 which may be anchored to the floor in any suitable manner. A horizontally disposed plate 21 is secured to the upper end of the column 16. A similar plate 22 covers the upper end of the column 17 and is secured thereto in any suitable manner. The plates 21 and 22 provide a base for the rails 23 and 24 which form one rail of the railway track. The plates 21 and 22 are desirably supported at such an elevation as to be aligned with the upper surface of cross ties which support the railway rails. A plate 26 is carried by the upper end of the column 18. A similar plate 27 covers and overlies the upper end of the column 19. These plates 26 and 27 are in horizontal alignment with the support for the rails 29 and 30 at the opposite side of the railway track.

The base plate 20 carries an upstanding anchor member 31 which may be secured to the base plate 20 in any suitable manner such as by welding. The anchor member 31 extends transversely of the roadway and has a length less than the space between the columns 17 and 19. A flexure plate 32 is secured to the upper portion of the anchor member 31 such as by means of a plurality of bolts 33. The anchor member 31 is of such length and the flexure plate 32 is of such width that the bolts 33 prevent the free end of the flexure plate as shown in FIG. 1 from being moved laterally of the path of movement of vehicles over the weighing apparatus. A relatively large opening 35 is provided in the flexure plate 32 for weight reducing purposes. The flexure plate 32 is provided with a plurality of openings 34 in the opposite end for attachment by means of bolts 36 to a weighbridge as hereinafter described. As shown in FIGS. 1 and 2, relatively narrow areas or bands 80 and 81 of reduced thickness extend transversely across flexure plate 32 near the ends thereof to provide for flexing in these areas.

A transversely disposed flexure strap 38 is secured by means of bolts 39 to the anchor member 31. The flexure strap 38 extends transversely of the roadway and the other end 41 is secured to the weighbridge frame by means of bolts 42. The flexure strap 38 serves to assist in preventing lateral movements of the weighbridge frame as hereinafter described.

The base plate 20 provides support for a plurality of load cells which may be of a known and conventional type. One load cell 51 may be secured to the plate 20 in any suitable manner adjacent the column 16. Another cell 52 is secured to the base plate adjacent the column 18. Another load cell 53 is secured to the base plate 20 adjacent the column 19. Another load cell 54 is secured to the base plate 20 adjacent the column 17. The load cells may be of the type wherein the electrical resistance of strain gauges serve to provide an indication of the weight applied on the respective cells.

A weighbridge is accommodated between the columns and is supported on the load cells. The frame structure which makes up the weighbridge is best shown in FIG. 1 and includes a longitudinally extending side member 61 and a similar longitudinally extending member 62 at the opposite side of the bridge. Plates 63 and 64 secured to the side member 61 respectively engage the upper ends of the load cells 51 and 54. Similar plates 65 and 66 engage the upper ends of the load cells 52 and 53. The end portion 67 of the flexure plate 32 is secured to the weighbridge by means of bolts 36 as best shown in FIG. 2. The end portion 41 of the flexure strap 38 is secured to the weighbridge by means of bolts as shown in FIG. 3. The weighbridge may be reinforced by means of angularly disposed structural elements 69 and 70.

The weighbridge is provided with an elongated plate 71 over the side member 61 and a similar plate 72 overlies the side member 62. These plates 71 and 72 provide support for short sections of the railway rails 73 and 74. These short rail sections may be secured to the weighbridge in any suitable manner. It will be observed from a consideration of FIG. 5 that the ball portions of the rails have angular end portions whereas the web and base portion of the short rails is disposed at ninety degrees with respect to the fixed rails.

It will be observed that when the assembly is mounted in association with a railway track it is possible to obtain an indication of the load of any pair of wheels of the railway vehicle as it moves across the weighbridge. The wheels glide from one of the fixed rails onto the rail sections 73 and 74. The weighbridge is free to move downwardly but the flexure plate 32 and the flexure strap 38 insure that none of the longitudinal impacts developed by the vehicle moving onto the scale assembly are imparted to the load cells. The weighbridge is restrained from twisting by the wide flexure plate 32. The weighbridge is restrained from shifting laterally of the roadway. Accordingly the load cells provide a true indication of the weight of the moving vehicle.

While the assembly has been described with reference to specific structural features it will be appreciated that changes may be made in the elements as well as the overall assembly. Such modifications and others may be made without departing from the spirit and scope of the invention.

What is claimed and desired to be secured by Letters Patent is:

1. A weighing scale assembly comprising, a base plate, a plurality of load cells supported on said base plate, a weighbridge supported by said load cells with the upper portion of the weighbridge substantially at the level of a roadway, an anchor member rigidly fixed to the base plate and projecting upwardly therefrom, a flexure plate attached at one end to the anchor member, means securing the other end of the flexure plate at laterally spaced points to the weighbridge, a flexure strap fixed at one end to the anchor member and extending in a direction transversely of the flexure plate, and means securing the other end of the flexure strap to the weighbridge.

2. A weighing scale assembly according to claim 1 wherein railway rails are carried by the weighbridge substantially in alignment with the rails of a railway track.

3. A weighing scale assembly according to claim 1 wherein the weighbridge consists of longitudinal and transverse members reinforced by angularly disposed members.

4. A weighing scale assembly according to claim 1 wherein the base plate is rectangular shaped in plan and one of the load cells is positioned adjacent each corner of the base plate.

5. A unitary weigh scale apparatus adapted to form a part of a railway track comprising a weighbridge having laterally spaced rail lengths, a base plate disposed in spaced relationship below the weighbridge and spanning the distance between the rail lengths, a load cell disposed below each end of each rail length attached to the base plate and supporting the rail lengths at the level of the rails of the said track, a flexure plate disposed in spaced relationship between the weighbridge and base plate and lying in a plane substantially parallel therewith, means for rigidly securing a first end of the flexure plate to the base plate and means for rigidly securing the opposite end of the flexure plate at laterally spaced points to the weighbridge, a flexure strap adjacent the said first end extending transversely of the flexure plate, means for rigidly securing one end of the flexure strap to the base plate, and means for rigidly securing the opposite end to the weighbridge.

6. The weigh scale apparatus of claim 5 wherein a means for supporting an end of said track is disposed adjacent each load cell and is rigidly secured to the base plate.

7. The weigh scale apparatus of claim 6 wherein said base plate is anchored to a rigid supporting means.

8. The weigh scale apparatus of claim 5 wherein the width of the flexure plate is such that the said means for securing said opposite end thereof prevents that end from moving laterally of the path of movement of vehicles over the weighbridge and the length of the flexure strap is such that lateral movement of the first end of the weighbridge with respect to the path of movement of vehicles over the weighbridge is prevented.

9. The weigh scale apparatus of claim 5 wherein said flexure plate has a relatively narrow transverse area of less thickness than the remainder of the plate near each end to provide for flexing thereof.

10. The weigh scale apparatus of claim 8 wherein said flexure plate is disposed within the area defined by said load cells.

* * * * *